United States Patent [19]

Manfroni

[11] 4,255,060

[45] Mar. 10, 1981

[54] HOMOGENIZING DEVICE

[75] Inventor: Ezio Manfroni, Bologna, Italy

[73] Assignee: Carpigiani Bruto Macchine Automatiche S.p.A., Bologna, Italy

[21] Appl. No.: 72,924

[22] Filed: Sep. 6, 1979

[30] Foreign Application Priority Data

Sep. 22, 1978 [IT] Italy .............................. 15257/78[U]

[51] Int. Cl.³ ........................................... B01F 15/06
[52] U.S. Cl. .................................... 366/137; 366/149
[58] Field of Search ............... 366/136, 137, 146, 149, 366/159, 270, 295; 99/348

[56] References Cited

U.S. PATENT DOCUMENTS

| 3,505,029 | 4/1970 | Polgar et al. ..................... 366/137 X |
| 3,565,404 | 2/1971 | Reid et al. ............................ 366/137 |
| 3,866,669 | 2/1975 | Gardiner .......................... 366/145 X |
| 4,169,359 | 10/1979 | Weerstra ......................... 366/146 X |

*Primary Examiner*—Edward L. Roberts

[57] ABSTRACT

A device for homogenization and thermal treatment of liquids, and particularly of liquid mixtures for the ice cream industry, comprising a container, a centrifugal pump communicating with the bottom of said container so as to continuously suck the liquid from said container and to pump it back into said container, and heating and cooling means in said pump in heat exchange relationship with the liquid flowing through said pump.

7 Claims, 3 Drawing Figures

HOMOGENIZING DEVICE

BACKGROUND AND SUMMARY OF THE INVENTION

This invention relates to a device for homogenization and thermal treatment of liquids, and particularly of liquid mixtures for ice-cream.

According to one feature of this invention, such a homogenizing device comprises a container provided at the bottom thereof with a pump, particularly a centrifugal pump, for circulating the liquid in the container, the said pump being provided with means for rapidly heating and cooling the liquids circulating therethrough.

According to another feature of this invention, said container comprises in the interior thereof mechanical stirring means actuated by the same motor that actuates said circulating pump.

According to a further feature of this invention, said circulating pump is connected to a rapid discharge duct for the treated liquid, said duct being provided with a check valve or cock.

BRIEF DESCRIPTION OF THE DRAWINGS

Other characteristics and advantages of this invention will be best understood from the following detailed description thereof, made with reference to the accompanying drawings, wherein.

DESCRIPTION OF THE PREFERRED EMBODIMENT OF THE INVENTION

Figure 1:
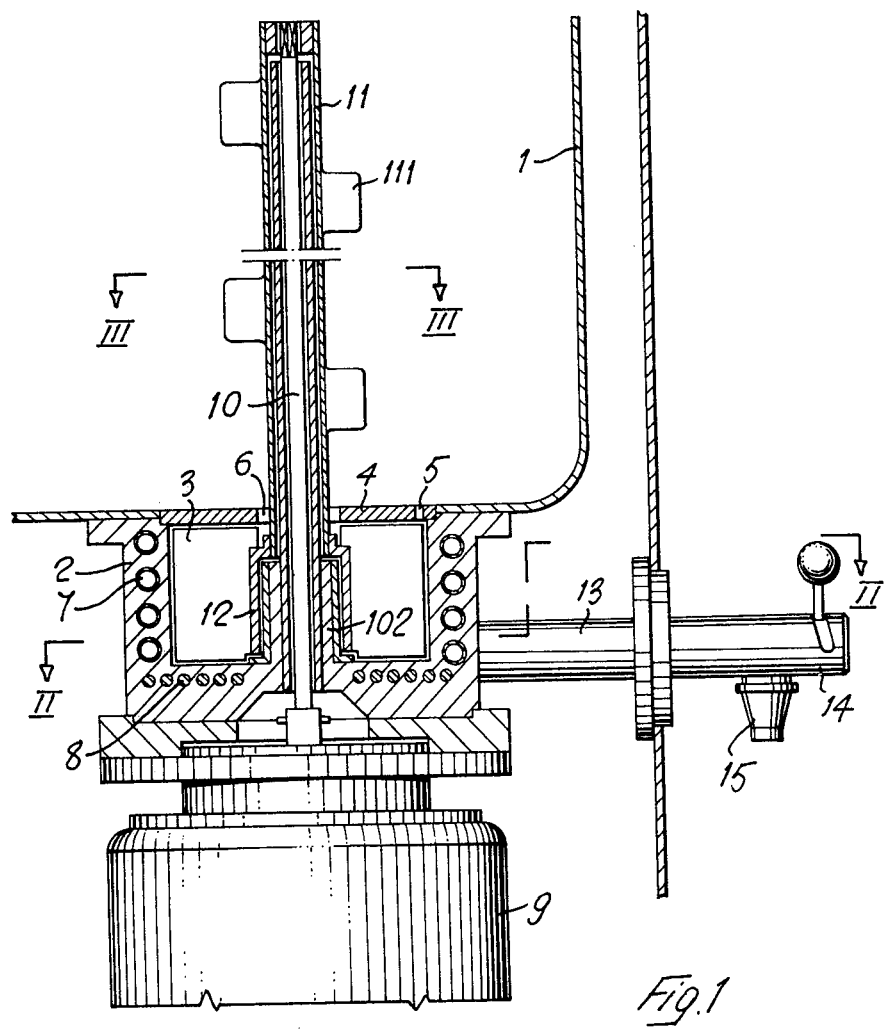
FIG. 1 is a longitudinal sectional view of the device according to the invention, with a circulating pump provided with heating and cooling means for the circulating liquid.
Figure 2:
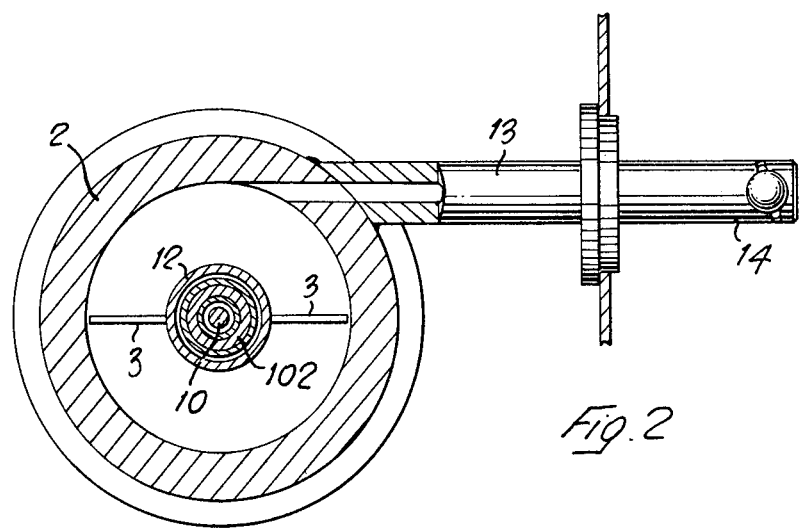
FIG. 2 is a cross-sectional view on line II—II of FIG. 1.
Figure 3:
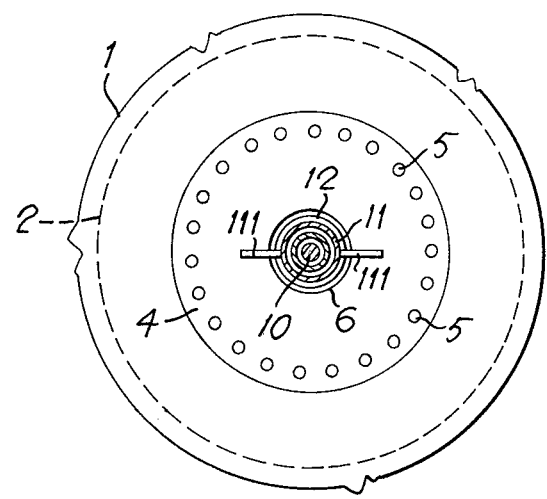
FIG. 3 is a cross-sectional view on line III—III of FIG. 1.

With reference to the drawings, the illustrated device comprises a container or reservoir 1 for the liquid mixture.

Centrally to the bottom of the container 1 the cylindrical body 2 of a centrifugal pump is secured. Said body 2 is a thick-walled aluminium housing that defines a cylindrical internal chamber 3 communicating with the interior of the container 1 through a circular opening in the bottom of said container 1. This opening is closed by a cover 4 having peripheral row of holes 5 and a central hole 6. Incorporated in the mass of the wall of said body 2 is a tubular coil 7 constituting the evaporator of a refrigerating unit (not shown), and incorporated in the mass of the bottom 2 is an electric heating resistance 8. Numeral 9 denotes an electric actuating motor the output shaft 10 of which is conducted through an axial hub 102 of body 2 up to the top end of the container 1. The shaft 10 is lined by a tube 11 provided with stirring blades 111, rotating with said shaft. The bottom end of said tubular liner 11 is secured to the impeller 12 of the centrifugal pump, supported by the hub 102. The chamber 3 of the pump communicates with a lateral discharge duct 13 having a suitable check valve 14 and a discharge mouth 15.

OPERATION OF THE DESCRIBED DEVICE

The operation of the described device will be evident. The rotation of the motor 9 is transmitted, through the shaft 10 and the tubular driving liner 11, to the impeller 12 of pump 2. When the valve 14 is closed, the liquid in the container 1 is sucked by the pump 2 through the annular port 6 and is pumped back into the container 1 through the circular row of holes 5 in the cover 4. The liquid is thus intimately mixed and stirred. This stirring action is increased by the stirring action of the blades 111 of the tubular liner 11. By activating the electric resistance 8, the mixture that circulates through the pump is heated with high efficiency. Then the mixture has reached the desired temperature, the resistance 8 is de-activated, and thereafter the refrigerating coil 7 is activated, whereby the mixture (still being stirred and homogenized), is submitted to a cooling action.

When the mixture in the container 1 has been treated as desired, it can be discharged from said container 1 by opening the discharge valve 14. If a rapid discharge is desired, the discharge rate can be increased by activating the centrifugal pump 2.

I claim:

1. A device for homogenization and thermal treatment of liquids for food-industry, and particularly of liquid mixtures for ice-cream, comprising a container, a centrifugal pump having both its inlet and outlet opening at the bottom of said container so as to suck the liquid from said container and to pump it back into said container, and heating and cooling means in said pump in heat-exchange relationship with the liquid flowing through said pump.

2. A device according to claim 1, wherein said pump is secured directly to the bottom of said container, and communicates with the interior of said container through a central suction port and a plurality or circular row of peripheral delivery ports.

3. A device according to any preceding claim, wherein the body of said pump is made of a good thermal conductor material, e.g. aluminium, and wherein heating and cooling elements are incorporated in said body.

4. A device according to claim 3, wherein said heating elements are electrical resistances, and said cooling elements are formed by the evaporator coil of a refrigerating unit.

5. A device according to claim 1, wherein said container is provided with mechanical stirring means for the liquid therein.

6. A device according to claim 1, wherein said pump communicates with a discharge duct to discharge the treated liquid.

7. A device according to claim 1, wherein said pump is actuated by an electric motor, the drive from the electric motor to the pump impeller being obtained by a tubular member which is co-axial with the motor shaft and is secured to the motor shaft at a position above the level of the liquid in the container.

* * * * *